United States Patent [19]

Decolibus

[11] Patent Number: 5,068,130

[45] Date of Patent: Nov. 26, 1991

[54] INHIBITION OF POLYMER FORMATION ON SURFACES INCLUDING VENTS BY USING AN INHIBITOR PAINT

[75] Inventor: Raymond L. Decolibus, Circleville, Ohio

[73] Assignee: E. I. DuPont de Nemours and Company, Wilmington, Del.

[21] Appl. No.: 601,971

[22] Filed: Oct. 23, 1990

[51] Int. Cl.$^5$ .......................... B05D 7/22; C08F 2/00
[52] U.S. Cl. .................................. 427/230; 427/239; 526/62
[58] Field of Search .................. 427/230, 239; 526/62; 422/131

[56] References Cited

U.S. PATENT DOCUMENTS

| | | | |
|---|---|---|---|
| 4,161,554 | 7/1979 | Ward et al. | 427/239 |
| 4,517,344 | 5/1985 | Mitani et al. | 526/62 |
| 4,880,885 | 11/1989 | Kleine et al. | 422/131 X |

Primary Examiner—Evan Lawrence
Attorney, Agent, or Firm—Ricard H. Burgess

[57] ABSTRACT

Polymerization of methacrylate and acrylate monomers on surfaces such as in vents is inhibited by coatings of water-base paint containing phenothiazine.

5 Claims, No Drawings

INHIBITION OF POLYMER FORMATION ON SURFACES INCLUDING VENTS BY USING AN INHIBITOR PAINT

BACKGROUND

This invention relates to polymerization processes. More particularly, it relates to such processes in which polymerization of methacrylate or acrylate monomers on vent surfaces is inhibited.

Many patents disclose inhibitor paints on the inside surfaces of polymerization reactor vessels for the prevention of formation of scale which could fleck off into the polymer and cause fish-eyes in paint made from the polymer. It is important not to prevent polymerization in the reactor as a whole, but just at the wall surfaces. It would be counterproductive to turn off or slow down polymerization, but the surfaces do need to be inhibited.

Belgian patent 845,168 of 1976 to Schinetzu discloses coating the inside of a polymerization reactor with an organic electron donor and an acceptor and an oxidizing agent or alternatives. As the donors, thiazines are mentioned, and thiophenols are mentioned among the alternatives to oxidizing agents. The result is to permit polymerization in the reactor but to prevent scale formation on the walls.

European patent 172,427 A of 1986 also to Schinetzu, uses compounds that may include 2-amino-4-phenylthiazole or 2-amino-5-phenylthiazole, optionally along with inorganics such as silicates, for the same purpose in vinyl chloride polymerization reactors.

European patent 19,197 of 1980 to Hoechst uses water-soluble substituted thiazine dye salt derivatives of a particular formula for similar purposes in vinyl chloride polymerization equipment.

In vents and conduits where complete elimination of polymerization is desirable, prior practice often used vapor phase inhibitors dissolved in solvents and sprayed into the vents. The high cost of continuous addition and the need to separate the inhibitors and solvents from the products in the case of conduit and reactor use are undesirable features. Also, solvent evaporation can create environmental problems.

If solid inhibitors are applied similarly, incomplete coverage and pluggage possibilities are problems.

SUMMARY OF THE INVENTION

A process for inhibiting polymerization of methacrylate or acrylate monomer on interior surfaces of vents, conduits or non-polymerizing process vessels, which comprises coating such surfaces with paint consisting essentially of a water-base film former and phenothiazine, curing the paint, and exposing the surfaces to such monomer.

Preferably, the volume concentration of the phenothiazine in the dried paint film is 20 to 80%. Among the paint film formers used is polyvinyl acetate, but preferably an acrylic copolymer is used, with the phenothiazine volume concentration at about 70%.

DETAILED DESCRIPTION OF THE PREFERRED EMBODIMENTS

When monomers condense on the inner surfaces of vents and conduits such as pipes from reactors, they can be more readily removed if they do not polymerize. Maintenance required to clean out such pipes and vents is much more costly if the monomers have polymerized in place. Also, non-polymerizing reactors such as for the production of higher monomers, present a quite different challenge than do polymerization reactors for preventing scale formation. Higher concentrations of much more aggressive inhibitors can be used if the reactor is not intended for polymerization. Thus, the same inhibitor system can be used for such non-polymerizing reactors as for the pipes and vents from reactors.

Generally, conduits transport gaseous or liquid materials between reactors and vents remove excess materials from reactors, generally in gaseous form but often with some entrained liquids.

Phenothiazine has been found to be very effective for the present invention. Since phenothiazine is not a salt and is not water soluble, it can be used at high concentrations in water-base paints. The purpose of the film former is to hold in place the phenothiazine and to present it for leaching into any monomers condensed on the surface or in a non-polymerizing reactor, particularly in an organic non-aqueous environment. This provides sacrificial inhibition of polymerization especially useful in vents where there is a relatively low concentration of polymerizable monomer. Maintenance and repair costs can be greatly reduced.

It has been found that phenothiazine in the proportions of the invention greatly retards the onset of polymerization of methylmethacrylate monomer in which a stainless steel coupon painted according to the invention and cured as is known in the art has been immersed. The onset of polymerization was 4 and 7 hours without the phenothiazine and longer than 305 hours with it in acrylic copolymer paint, an improvement of over 19 times. A test using vinyl acetate paint vehicle gave 116 hours, or an improvement of 10.4 times. Aqueous paint vehicles of vinyl acetate at 55% solids and of a copolymer of 35% acrylonitrile, 60% butyl acrylate and 5% methacrylic acid, at 46% solids content, were used. All proportions herein are by weight except where indicated otherwise. The acrylic copolymer paint vehicle provides longer resistance to higher concentrations of methyl methacrylate monomer than does the vinyl acetate paint vehicle.

It has been found that use of the invention in an industrial vent prolonged cleaning out polymer depositions from every 2–3 months to more than 6 months.

What is claimed is:

1. A process for inhibiting polymerization of methacrylate or acrylate monomer on interior surfaces of vents, conduits or non-polymerizing process vessels, which comprises coating such surfaces with paint consisting essentially of a water-base film former and phenothiazine, curing the paint, and exposing the surfaces to such monomer.

2. The process of claim 1 wherein the volume concentration of the phenothiazine in the dried paint film is 20 to 80%.

3. The process of claim 2 wherein the paint vehicle is polyvinyl acetate.

4. The process of claim 2 wherein the paint vehicle is an acrylic copolymer.

5. The process of claim 4 wherein the volume concentration of phenothiazine in the dried paint film is about 70%.

* * * * *